United States Patent
Hiraoka et al.

[11] Patent Number: 6,039,618
[45] Date of Patent: Mar. 21, 2000

[54] EXHAUST ARRANGEMENT FOR OUTBOARD MOTOR

[75] Inventors: Noriyoshi Hiraoka; Masanori Takahashi, both of Hamamatsu, Japan

[73] Assignee: Sanshin Kogyo Kabushiki Kaisha, Hamamatsu, Japan

[21] Appl. No.: 09/120,614

[22] Filed: Jul. 22, 1998

[30] Foreign Application Priority Data

Jul. 22, 1997 [JP] Japan .................................... 9-210154
Aug. 29, 1997 [JP] Japan .................................... 9-247556

[51] Int. Cl.$^7$ ........................................ B63H 1/00
[52] U.S. Cl. ............................ 440/89; 123/195 P; 60/321
[58] Field of Search ................................ 440/88, 89, 77; 60/321; 123/195 P

[56] References Cited

U.S. PATENT DOCUMENTS 5,487,688   1/1996   Sumigawa .................................. 440/88
5,733,157   3/1998   Okuzawa et al. ......................... 440/89
5,873,755   2/1999   Takahashi et al. ....................... 440/77

*Primary Examiner*—Jesus D. Sotelo
*Attorney, Agent, or Firm*—Knobbe, Martens, Olson & Bear LLP

[57] ABSTRACT

A number of the embodiments of exhaust systems and oil tank arrangements for four-cycle internal combustion engine powered outboard motors. In all of the embodiments, idle exhaust gases are discharged to the atmosphere through a path that extends above the oil tank. A cooling jacket is formed around an exhaust pipe that depends through a cavity in the oil tank and coolant from this cooling jacket is discharged to the exterior surface of the exhaust pipe so as to cool it. Cooling water from the engine and from the exhaust pipe cooling jacket is isolated from the idle exhaust gas discharge so as to ensure that this cooling water cannot enter the engine through the idle exhaust gas discharge path.

26 Claims, 13 Drawing Sheets

EXHAUST ARRANGEMENT FOR OUTBOARD MOTOR

BACKGROUND OF THE INVENTION

This invention relates to an outboard motor and more particularly to an improved exhaust arrangement for outboard motors having four-cycle internal combustion engines.

Because of the compact nature of an outboard motor, it has been generally the practice to employ an exhaust system that includes an expansion chamber in the drive shaft housing and a below the water high speed exhaust gas discharge from which the gases from the expansion chamber are discharged to the atmosphere. The expansion chamber performs the function of assisting and silencing of the exhaust gases as does the underwater exhaust gas discharge.

With this type of arrangement, however, it is also the practice to provide an above the water exhaust gas discharge for discharging the exhaust gases directly to the atmosphere and not through the body of water in which the watercraft is operating under at least some running conditions. The reason for the necessity for the above the water exhaust gas discharge is that when the engine is running is low speeds and the associated watercraft is not planing, the underwater exhaust gas discharge is quite deeply submerged. This coupled with the low pressure of the exhaust gases under these running conditions makes the utilization of the underwater exhaust gas discharge impractical if not impossible.

Various arrangements have been proposed for delivering the exhaust gases to the above the water exhaust gas discharge. Generally, these arrangements draw the exhaust gases off from the expansion chamber and pass through a series of orifices or a convoluted path before delivery to the above-the-water exhaust gas discharge. This is done so as to provide not only silencing but to limit the amount of exhaust gases that flow through this path when traveling at high speeds.

These theories are quite practical and have been found efficient in use. However, there is recently a renewed interest in employing four-cycle engines as the power plants in outboard motors. A four-cycle engine, unlike a two-cycle engine, requires a source of lubricant to hold the lubricant that has recirculated through the engine for lubricating purposes. In order to provide adequate storage capacity and to maintain a low profile for the outboard motor, the oil tank is generally positioned in the drive shaft housing.

This positioning for the oil tank exposes it to the exhaust gases and thus, presents a problem of heating the oil tank. If the exhaust gases for the above the water discharge pass in proximity to the oil tank, as is the normal practice, then the oil may become heated even when the engine is running at low speeds. This is undesirable.

It is, therefore, a principal object of this invention to provide an improved exhaust system for an outboard motor.

It is a further object of this invention to provide an improved exhaust system for an outboard motor and particularly one having a four-cycle engine wherein the idle exhaust gases are maintained in an isolated manner from the oil tank.

It is a further object of this invention to provide an improved idle exhaust discharge for a four-cycle outboard motor.

SUMMARY OF THE INVENTION

This invention is adapted to be embodied in an outboard motor that is comprised of a powerhead containing a powering four-cycle internal combustion engine and a surrounding protective cowling. A drive shaft housing depending from the powerhead and a lower unit at the lower portion of the drive shaft housing contains a propulsion device for propelling an associated watercraft. A transmission extends through the drive shaft housing and into the lower unit for driving the propulsion device. The drive shaft housing forms an expansion chamber to which exhaust gases are delivered from the engine via an exhaust pipe. The expansion chamber discharges a exhaust gases to the atmosphere through an underwater exhaust gas discharge. An above the water exhaust gas discharge is formed that is above the normal water level. An oil tank for the engine is positioned in the drive shaft housing at an area positioned in the upper portion of the expansion chamber. Means are providing for delivering exhaust gases from the engine to the above the water exhaust gas discharge through a path that extends vertically above the level of oil in the oil tank so as to minimize heat transfer between the idle exhaust gases and the oil in the oil tank.

DETAILED DESCRIPTION OF THE PREFERRED EMBODIMENTS

Figure 1:
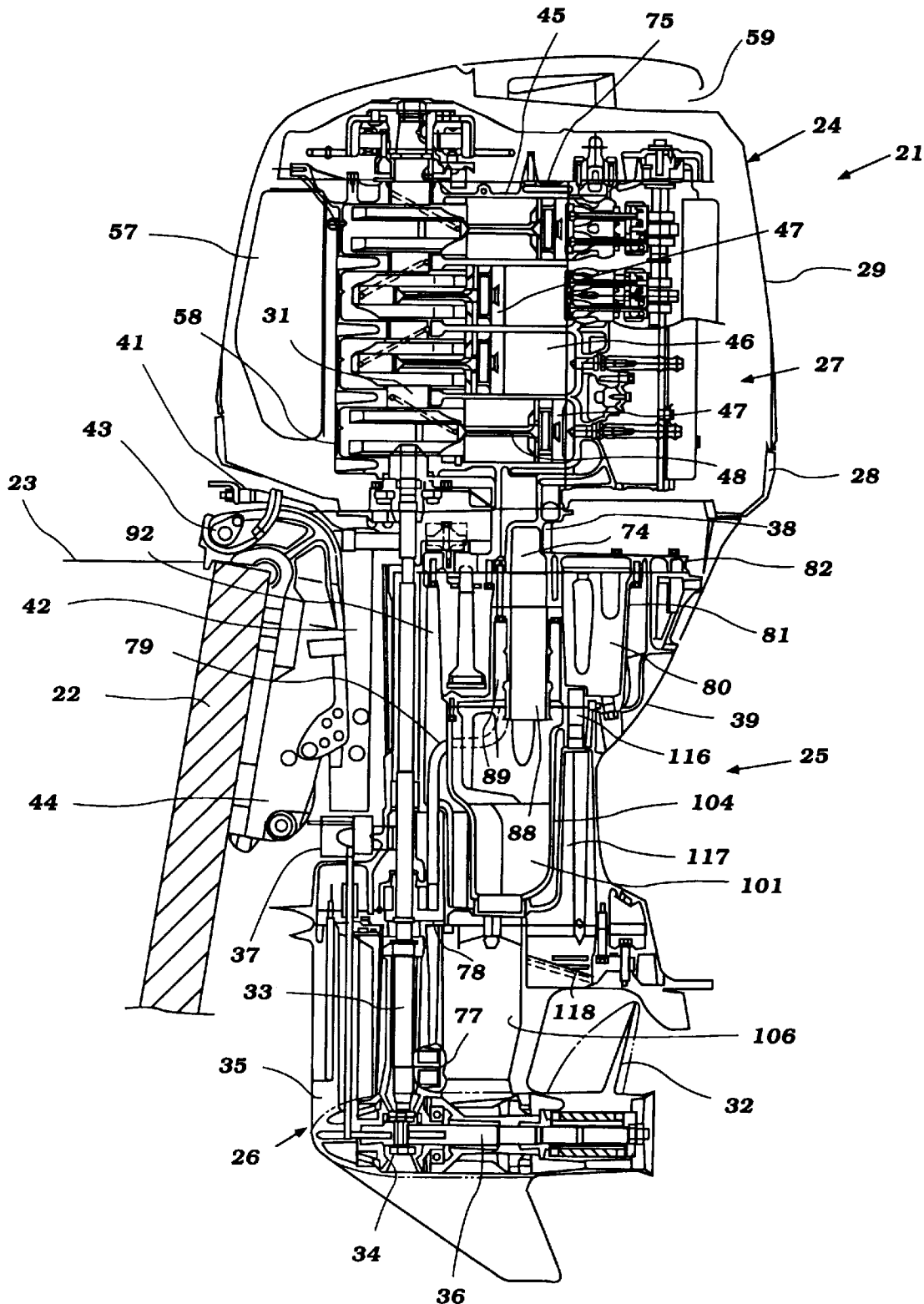
FIG. 1 is a side elevational view of an outboard motor that is typical for all of the embodiments of this invention and which is shown in primarily in cross-section and as attached to the transom of an associated watercraft, which is shown only partially and also in cross-section.
Figure 2:
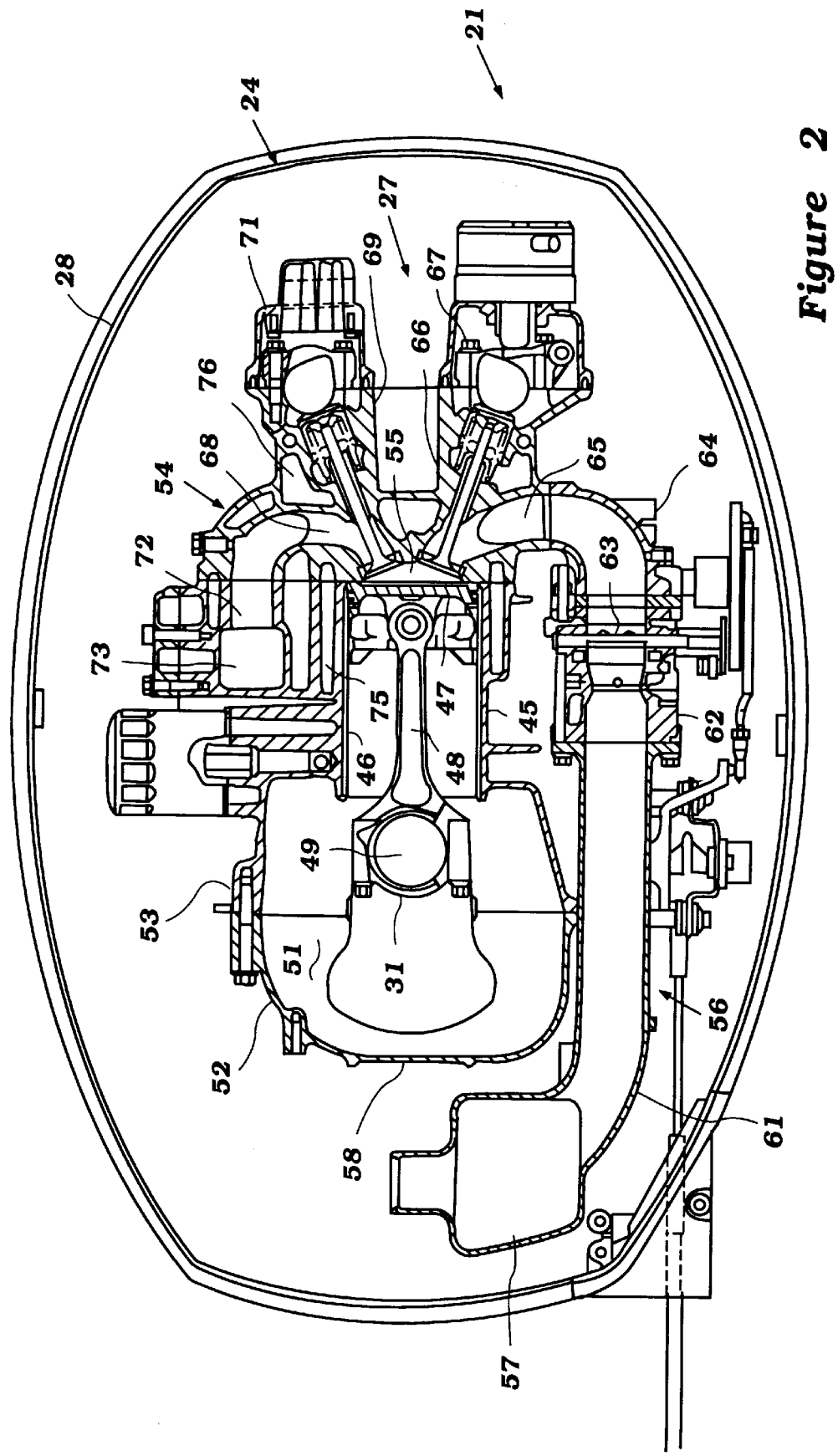
FIG. 2 is an enlarged top plan view of the outboard motor powerhead with the protective cowling removed and with the engine shown in cross-section and is also typical for all embodiments of the invention.

Referring now in detail to the drawings and initially to FIGS. 1 and 2, an outboard motor which has a general construction that is typical for all of the embodiments disclosed herein is illustrated and is identified generally by the reference numeral 21. The outboard motor 21 is depicted as attached to a transom 22 of a watercraft which is shown partially and identified by the reference numeral 23.

The outboard motor 21 is comprised of a powerhead, indicated generally by the reference numeral 24; a drive shaft housing assembly, which depends from the powerhead 24 and which is identified generally by the reference numeral 25, and a lower unit, positioned at the lower end of the drive shaft housing 25 and indicated generally by the reference numeral 26.

The powerhead 24 contains a powering internal combustion engine 27 that is surrounded by a protective cowling that is comprised of a lower tray 28 and an upper main cowling member 29 that is detachably connected to the tray 28 in a suitable manner. As will become apparent and as is typical with outboard motor practice, the engine 27 is positioned in the powerhead 24 so that its crankshaft 31 rotates about a vertically extending axis. This is done so as to facilitate coupling of the crankshaft 31 to a transmission that is contained primarily within the drive shaft housing 25 and lower unit 26 for driving a propulsion device provided within the lower unit 26. In the illustrated embodiment, this propulsion device is comprised of a propeller 32.

The transmission is comprised primarily of drive shaft 33 that has a splined connection at its upper end to the crankshaft 31. A bevel gear is carried on the lower end of the drive shaft 33 and drives a conventional bevel gear reversing transmission 34 that is contained within a transmission cavity of the housing 35 of the lower unit 26. This transmission selectively drives a propeller shaft 35 in forward or reserve directions. The propeller 32 is affixed to the propeller shaft 35.

A steering shaft (not shown) is affixed to the drive shaft housing assembly 25 by means including a lower bracket 37. The upper end of this steering shaft is connected to an exhaust guide, indicated generally by the reference numeral 38 and upon which the engine 27 is supported at the upper end of an outer housing 39 of the drive shaft housing assembly 25. This steering shaft has a tiller 42 affixed to it so as to steer the outboard motor 21 about a vertically extending axis defined by a swivel bracket 42 in which the steering shaft is journaled.

The swivel bracket 42 is, in turn, connected by means of a pivot pin 43 to a clamping bracket 44. Pivotal movement about the pivot pin 43 permits tilt and trim movement of the outboard motor 21 as well as tilting of the outboard motor 21 to an out of the water position, as is well known in this art. The clamping bracket 44 is suitably, detachably affixed to the watercraft transom 22.

Continuing to refer primarily to FIGS. 1 and 2, the internal combustion engine 27 that forms the prime mover for the powerhead 24 will now be described. In the illustrated embodiment, the engine 27 is of the four-cylinder, inline type and operates on a four-stroke principal. Although the number of cylinders and cylinder orientation can be varied without departing from the invention, the invention does have particular utility in conjunction with four-cycle engines. This is because four-cycle engines normally have an oil tank that contains a fairly substantial volume of lubricant that is recirculated and which must be maintained at not too high a temperature. Of course, the invention can also be employed with two-cycle engines which incorporate oil tanks in the assembly of the outboard motor.

The engine 27 includes a cylinder block 45 in which four vertically spaced, horizontally extending cylinder bores 46 are formed. Pistons 47 are slidably supported within these cylinder bores 46 and are connected to the small ends of connecting rods 48 in a known manner. The big ends of the connecting rods are journaled on the throws 49 of the crankshaft 31. The crankshaft 31 is rotatably journaled within a crankcase chamber 51 formed by a crankcase member 52 and a skirt portion 53 of the cylinder block 45 to which the crankcase member 52 is affixed in any suitable manner.

A cylinder head assembly, indicated generally by the reference numeral 54 is affixed to the end of the cylinder block 45 opposite to the crankcase member 52. The cylinder head assembly 54 has individual recesses 55 formed in its lower face each of which cooperates with a respective one of the cylinder bores 46 and the heads of the piston 47 to form the combustion chambers of the engine.

An induction system, indicated generally by the reference numeral 56 supplies a charge to these combustion chambers. This induction system 56 includes an air inlet device and silencer 57 which is mounted in the powerhead 24 at the forward end of the main cowling member 29 and in spaced relationship to a vertically extending, forward face 58 of the crankcase member 52. The air inlet and silencer device 57 draws atmospheric air from within the protective cowling 29. This air is admitted through a rearwardly facing air inlet opening 59 formed in the main cowling member 29.

A plurality of intake pipes 61 extend from the air inlet device 57 to individual throttle bodies 62. These throttle bodies 62 include flow controlling throttle valves 63 for controlling the speed of the engine 27 in a manner well known in the art. These throttle bodies 62 each cooperate with a respective intake manifold runner 64 that serves a cylinder head intake passage 65.

An intake valve arrangement, indicated generally by the reference numeral 66, is mounted in the cylinder head assembly 54 and is operated by an intake camshaft arrangement 68 for opening and controlling the admission of a charge to the combustion chamber recesses 55 from the cylinder head intake passages 65. The intake camshaft 67 is driven at one-half crankshaft speed by any suitable timing drive.

Spark plugs (not shown) are mounted in the cylinder head assembly 54 and fire a charge that is delivered to the combustion chambers. These spark plugs are fired by a suitable ignition system. In addition to the air charge which has been delivered, fuel may be added to the combustion chambers either by means of carburetors, manifold injectors are direct cylinder injectors to form the fuel air mixture that is fired by the spark plugs. Since this charge forming system forms no part of the invention, further description of it is not believed to be necessary to permit those skilled in the art to practice the invention.

The charge which has been burned in the engine combustion chambers is discharged therefrom through an exhaust passage arrangement 68 formed in the cylinder head assembly 54 on the side opposite the intake passage arrangement 65. An exhaust valve assembly, indicated generally by the reference numeral 69 and which is operated by an exhaust camshaft 71, is provided for controlling the communication of the combustion chambers with this exhaust passage arrangement 68. Like the intake camshaft 67, the exhaust camshaft 71 is driven by a suitable timing mechanism at one-half crankshaft speed.

The cylinder head exhaust passage arrangement 68 has a reentrant or U-shape and discharges into manifold runners 72 that are formed integrally within the cylinder block 46 in a face that mates with the cylinder head assembly 54. These runners 72 serve an exhaust manifold 73 that extends vertically through the side of the cylinder block 53 and which terminates in a downwardly facing exhaust discharge passage.

This exhaust discharge passage communicates with an exhaust passage formed in the exhaust guide plate 54, one form of which appears in the embodiment of FIGS. 3–6 and which is indicated by the reference numeral 74. This exhaust guide passage 74 communicates with an exhaust system for discharging the exhaust gases from the engine 27 to the atmosphere. The remaining portion of the exhaust systems for the various embodiments are different from each other in certain regards. Therefore and since this initial description is of the common portion of the outboard motor 21, the remainder of the exhaust system will not be described further at this time.

As is typical with outboard motor practice, the engine 27 is water cooled. To this end, the cylinder block 53 is provided with a cooling jacket 75. In a similar manner, the cylinder head 54 is provided with a cooling jacket 76. The cylinder block cooling jacket 75 and the cylinder head cooling jacket 76 are in communication with each other in any suitable manner.

Water for cooling the engine 27 is taken from the body of water in which the watercraft 23 is operating through an underwater coolant inlet opening 77 formed in the lower unit housing 35. This water is drawn by a water pump 78 that is directly driven off of the drive shaft 33 at the interface between the housing 39 of the drive shaft housing assembly 25 and the housing 35 of the lower unit 26. This water is then delivered upwardly toward the engine 27 through a supply conduit 79.

The structure of the outboard motor 21 as thus far described, is typical of all embodiments and may generally be assumed to be conventional. Therefore, where any components of the engine 27 or of the outboard motor 21 and its propulsion system have not been described, resort may be had to any conventional structure with which to practice the invention.

The invention deals primarily with the manner in which the exhaust gases are treated and also the relationship between the exhaust system and an oil reservoir for the engine 27, the oil chamber of which is indicated by the reference numeral 80 in common with all embodiments. Basically, this oil reservoir 80 is formed from an oil reservoir forming member 81 that is affixed to the underside of the exhaust guide 38 by means of threaded fasteners 82.

Referring now specifically to the first embodiment and, therefore, additionally to FIGS. 3–6, it will be seen that the oil reservoir forming member 81 defines a cavity 83 by means of an inner surface 84. An exhaust pipe 85 is affixed via a spacer member 86 to the underside of the exhaust guide 38 in open communication with the exhaust discharge opening 74. The spacer 86 has a complimentary exhaust receiving opening 87 that receives the exhaust gases from the exhaust guide plate discharge opening 74 and transfers them to a like opening 88 formed in the exhaust pipe 85.

From there, the exhaust gases are delivered downwardly to a first expansion chamber volume 89. This expansion chamber volume 89 is formed by a further wall of the oil pan forming member 81 that defines a channel 91 which, in turn, communicates with a further expansion chamber 92 formed by the inner periphery of the drive shaft housing member 39 around the outer periphery of the remainder of the oil pan chamber 80.

Figure 3:
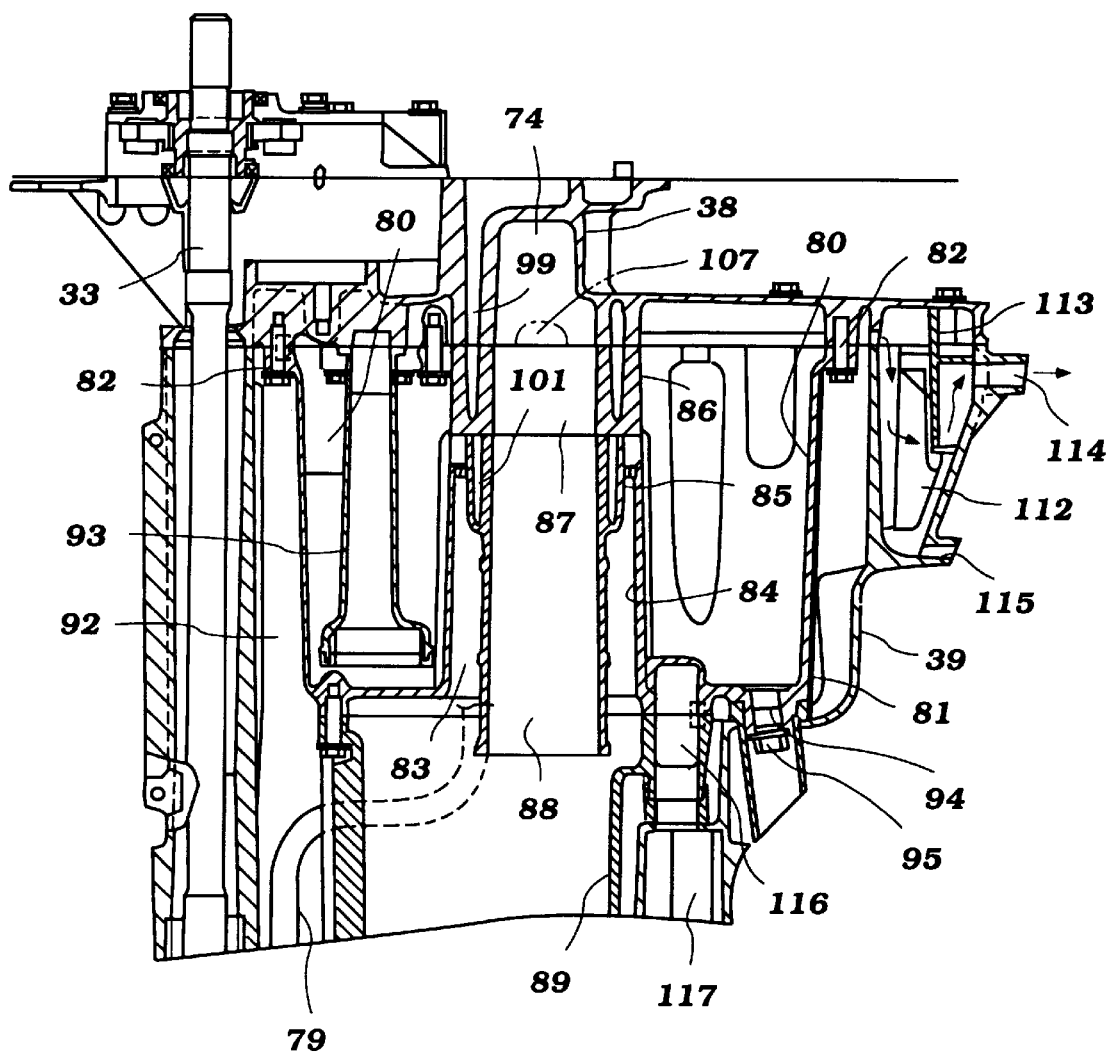
FIG. 3 is a cross-sectional view taken along the same plane as FIG. 2 and shows the construction at the upper portion of the drive shaft housing and lower unit.

As may be best seen in FIG. 3, although it also appears in FIG. 1, a pickup tube 93 depends into the oil pan chamber 81 and is connected at its upper end to a passage in the exhaust guide 39 that communicates with an oil pump for delivery of the lubricant to the engine lubricating system. Oil is returned to the oil pan 80 through a suitable drain arrangement.

As also best seen in FIG. 3, the oil pan forming member 81 has a discharge nipple 94 that is positioned in proximity to the drive shaft housing 39 and which has a drain plug 95 so that the oil can be removed from the outboard motor from externally of the drive shaft housing assembly 25 without removal of the engine.

Figure 4:
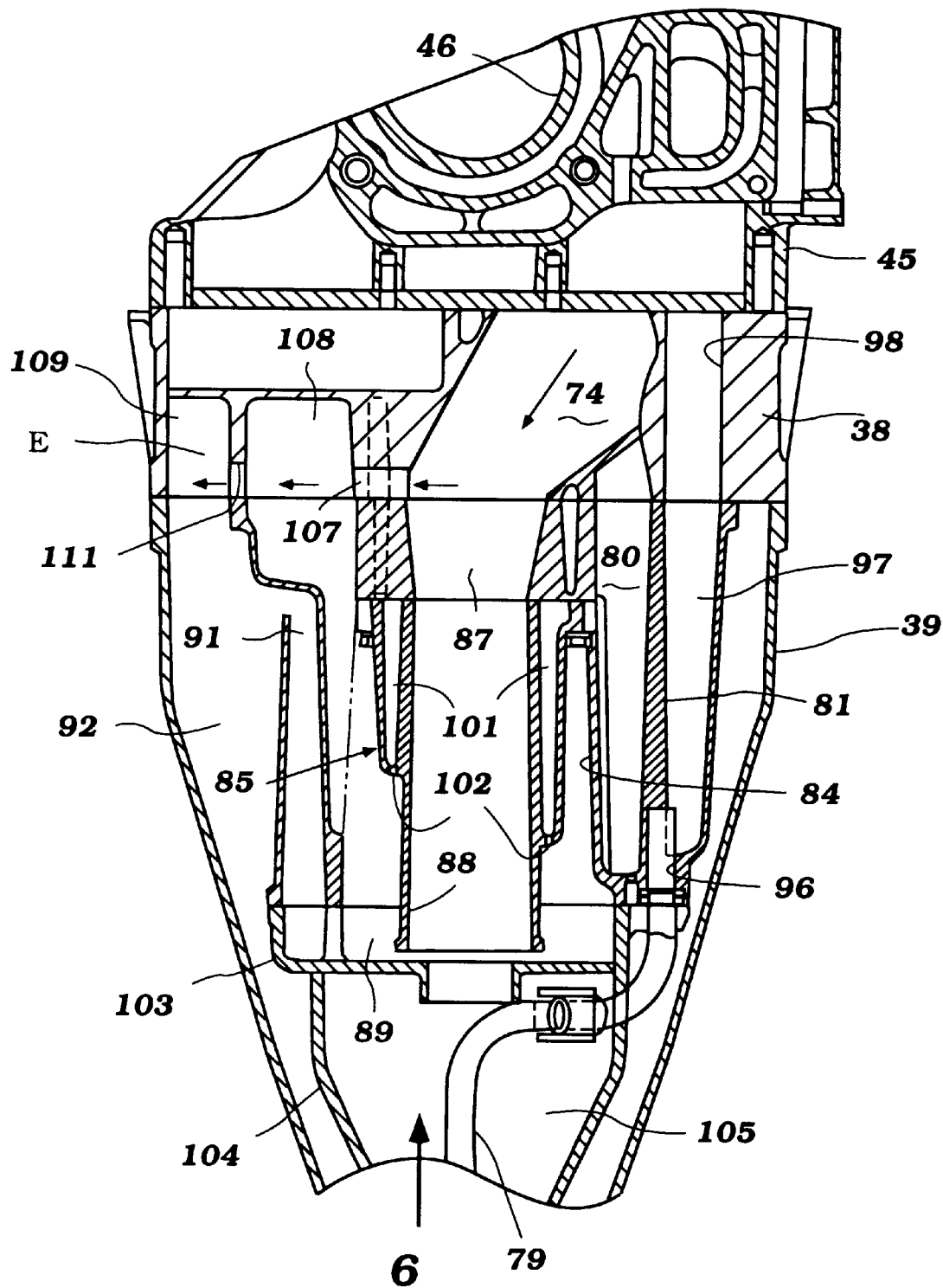
FIG. 4 is a cross-sectional view taken along the line 4—4 of FIG. 6 showing generally the same area illustrated in FIG. 3.

As best seen in FIG. 4, the coolant conduit 79 terminates in a fitting 96 formed in the lower portion of the oil pan forming member 81 which defines a water delivery cavity 97 that extends along one peripheral wall of the oil pan forming member 81 in heat exchanging registry with the oil cavity 80 so as to assist in cooling the lubricant contained therein. This coolant flows upwardly through a delivery passage 98 in the exhaust guide 38 for delivery to the engine cooling jackets 75 and 76 already described.

As best seen in FIGS. 3 and 4, the exhaust guide 38 and the exhaust spacer plate 86 are formed with a cooling jacket 99 which encircles the exhaust passages 74 and 87 of the exhaust guide 38 and exhaust spacer 86, respectively. Water is delivered to this cooling jacket 99 after it has circulated through the engine cooling jackets 75 and 76, respectively. Not all of the engine coolant is, however, returned in this area.

The water from the cooling jacket 99 of the exhaust guide 38 and spacer 86 is delivered to a cooling jacket 101 which encircles the upper end of the exhaust pipe 85. This cooling jacket 101 does not extend to the lower end of the exhaust pipe 85. Rather, it terminates at staggered points along the length and has a pair of discharge openings 102 which are positioned in close proximity to the exterior of the exhaust pipe 85. Coolant drains out of these openings 102 and flows across the exterior of the exhaust pipe 85 so as to provide some additional cooling for the exhaust gases.

A plate-like shell 103 extends across the lower end of the oil pan 81 and cooperates with a further inner shell 104 of the drive shaft housing assembly 25 to define an expansion chamber 105 in the lower portion of the drive shaft housing outer shell 39 that is in open communication with and forms an extension of the expansion chamber 89.

This lower expansion chamber 105 communicates with an exhaust passage 106 formed in the lower unit 35 and which communicates with an underwater exhaust discharge formed in the hub of the propeller 32 for high speed underwater discharge of the exhaust gases. Thus, the combination of the expansion chamber 105, the lower unit expansion chamber 106 and the underwater exhaust gas discharge provide efficient silencing of the exhaust gases when traveling at higher speeds.

Although the portion of the exhaust system as thus far described provides good silencing when operating under a high speed running conditions, when the watercraft is traveling at slower speeds and is not in a planing condition, or when operating at idle, the through-the-hub underwater exhaust gas discharge will be too deeply submerged for the exhaust gases to exit this path. Also, under this condition, the exhaust gas pressure is lower and thus, this exhaust path cannot be employed.

Although above the water exhaust gas discharges are common with outboard motors, when utilized with four-cycle engines that have oil tanks in the drive shaft housing, there is a risk that the idle exhaust gases may come in contact with the oil tank and heat it. Also, when water is used to cool the exhaust pipe, there is a risk that this water may enter the engine through the exhaust system, particularly if the water discharged from the exhaust cooling jacket is in proximity to the idle exhaust gas discharge. Now to be described idle exhaust gas discharge of this embodiment routes the exhaust gases in a way that they do not come into contact with the oil pan under idle and also are spaced substantially from the water that is utilized to cool the engine and particularly the high speed exhaust cooling system.

Figure 5:
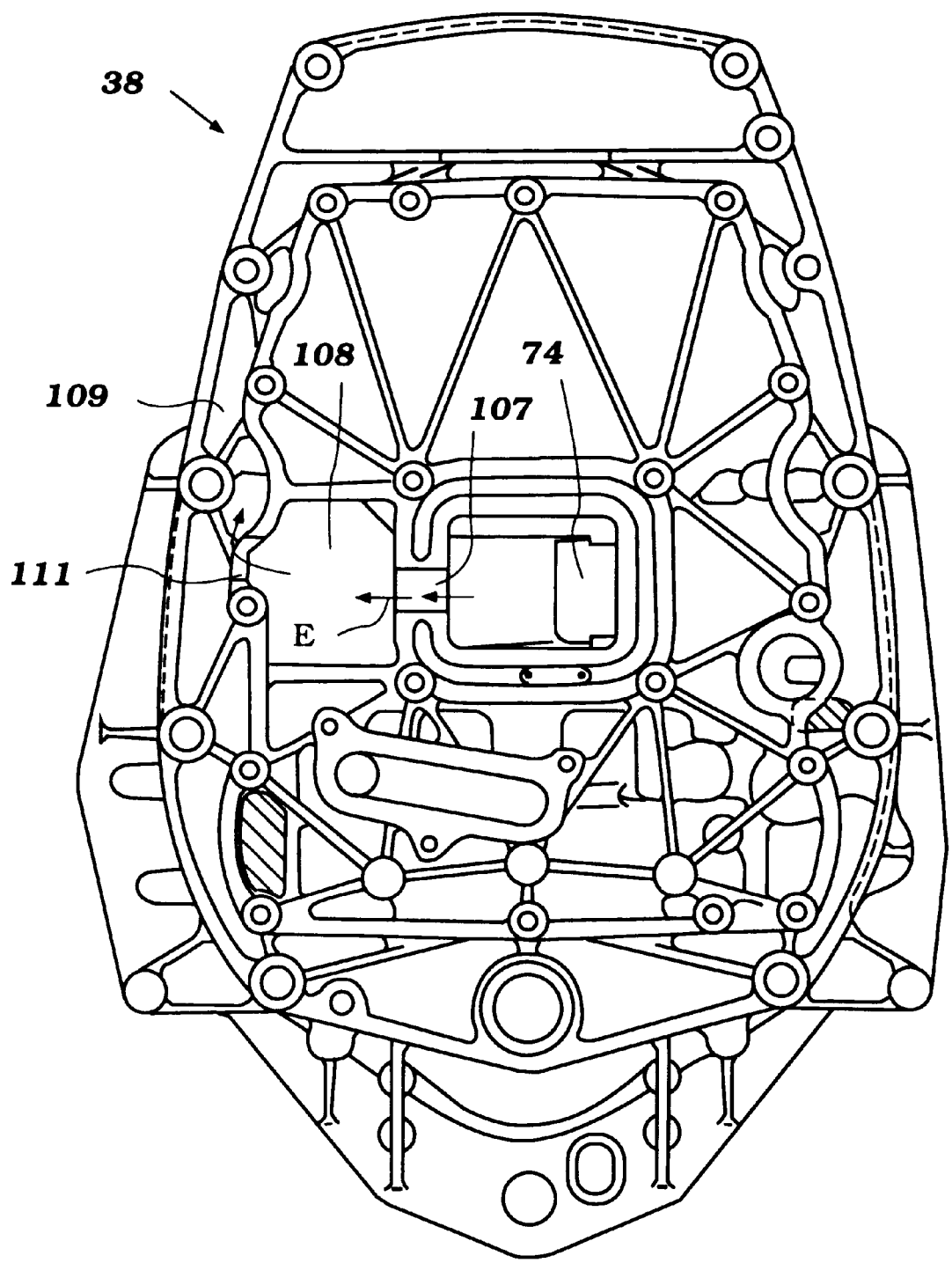
FIG. 5 is a bottom plan view of the exhaust guide for the engine.
Figure 6:
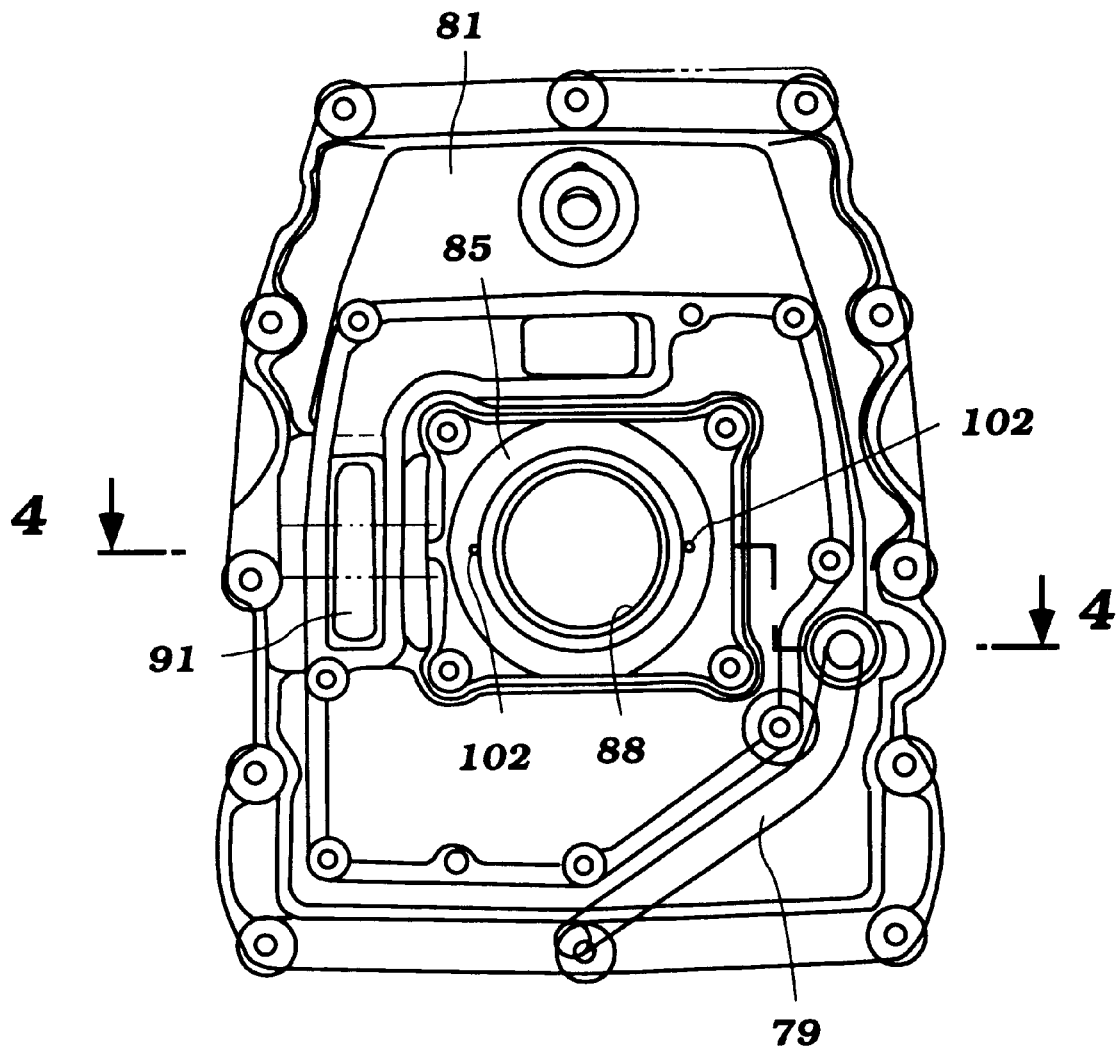
FIG. 6 is a bottom plan view looking generally in the direction of the arrow 6 in FIG. 4 but with the lower housing shell removed so as to more clearly show the construction.

As best seen in FIGS. 4 and 5, the exhaust guide 38 is provided with an idle exhaust gas groove 107 on its lower face which communicates directly with its exhaust passage 74 and above the passage 87 in the exhaust spacer 86. The lower portion of this groove is closed by the exhaust spacer element 86 so that the exhaust gases flow in the direction of the arrows E in FIGS. 4 and 5 under idle conditions.

From the passage 107, the idle exhaust gases pass into a first idle expansion chamber 108 formed on the underside of the exhaust guide 38. Thus, this first expansion causes silencing of the exhaust gases.

From the expansion chamber 108, the exhaust gases are then delivered to a further longitudinally extending expansion chamber 109 through a restricted opening 111 also formed in the underside of the exhaust guide 78 and which is closed by the upper portion of the oil pan forming member 81. These gases thus, are further silenced due to this additional expansion and contraction.

The exhaust gases then flow rearwardly as seen in FIGS. 1 and 4 to a further expansion chamber 112 formed at the back of the drive shaft housing member 39. This expansion chamber 112 has a further baffle plate 113 across which the exhaust gases must pass before they can exit to the atmosphere through an above-the-water idle exhaust gas discharge port 114 formed in the drive shaft housing member 39.

A small water drain 115 is positioned at the lower portion of the expansion chamber 112 so as to permit any accumulated water in the exhaust gases to be separated and drained out.

It has been noted that the exhaust system cooling jackets 99 and 101 do not receive all of the cooling water from the engine. The bulk of the cooling water is returned to the body of water in which the watercraft is operating through a return passage 116 (FIG. 6) that communicates with a vertically extending water discharge channel 117 formed at the back of the drive shaft housing. As seen best in FIG. 1, a water drain opening 118 is formed in the outer housing member 39 at a relatively low position from which this engine coolant can drain back into the body of water in which the watercraft is operating.

Figure 7:
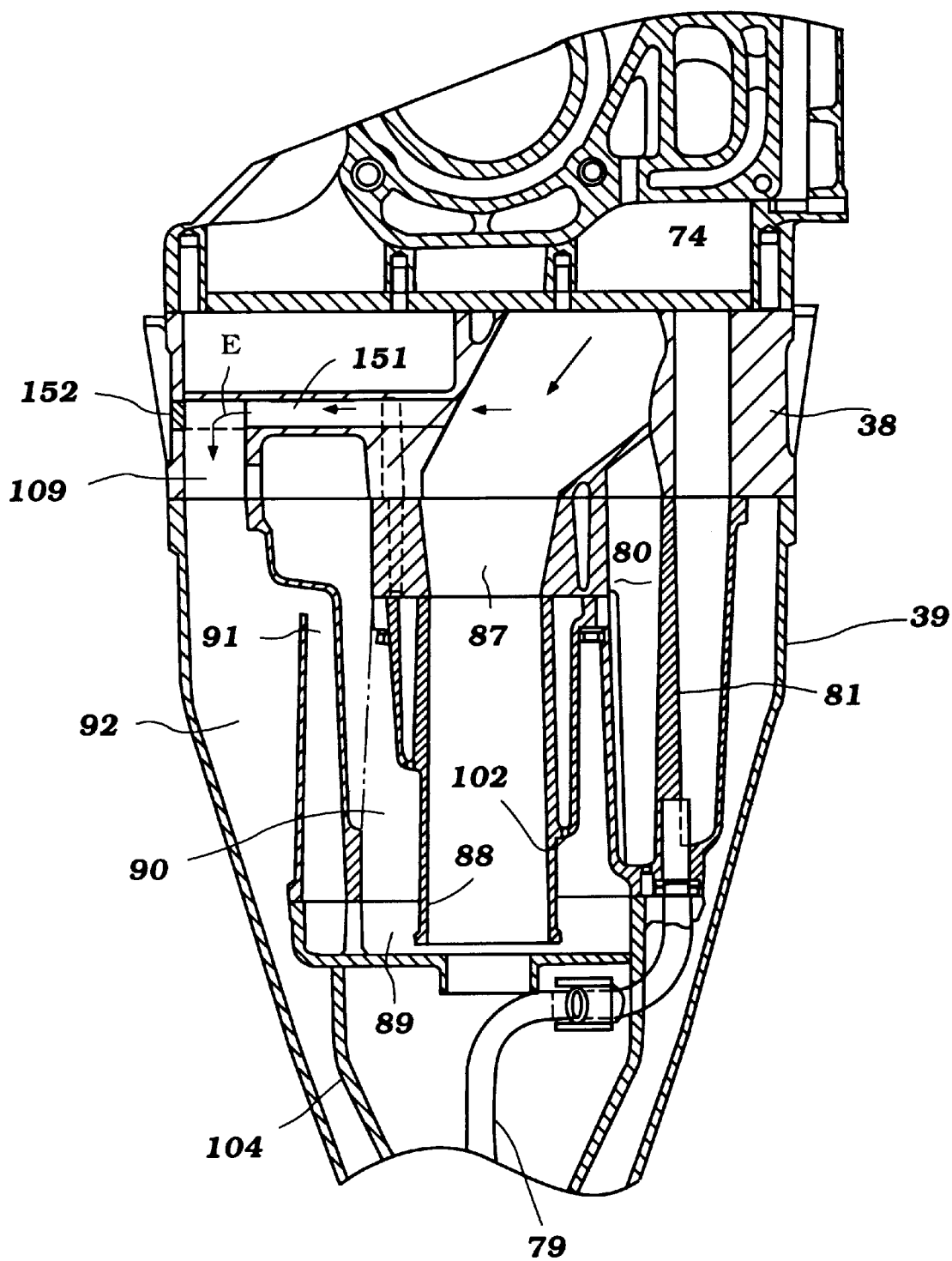
FIG. 7 is a view, in part similar to FIG. 4 but shows a second embodiment of the invention.

FIG. 7 illustrates another embodiment which is basically the same as the embodiment of FIGS. 1–6 and thus, only a single figure is believed necessary to enable those skilled in the art to practice this embodiment. FIG. 7 is a cross-sectional generally the same as FIG. 4 and shows that the exhaust passage 74 of the exhaust guide plate 38 is intersected by a drilled idle discharge passage 151 that opens directly into the longitudinally extending expansion chamber 109. The outer end of the drilled passage 151 is closed by a closure plug 152.

Hence, with this embodiment, the first expansion chamber is eliminated but the idle exhaust gases are even more separated from the oil reservoir area 80. In all other regards, this embodiment is the same as that previously described and, therefore, further description of it is not believed to be necessary to permit those skilled in the art to practice this embodiment of the invention.

Figure 8:
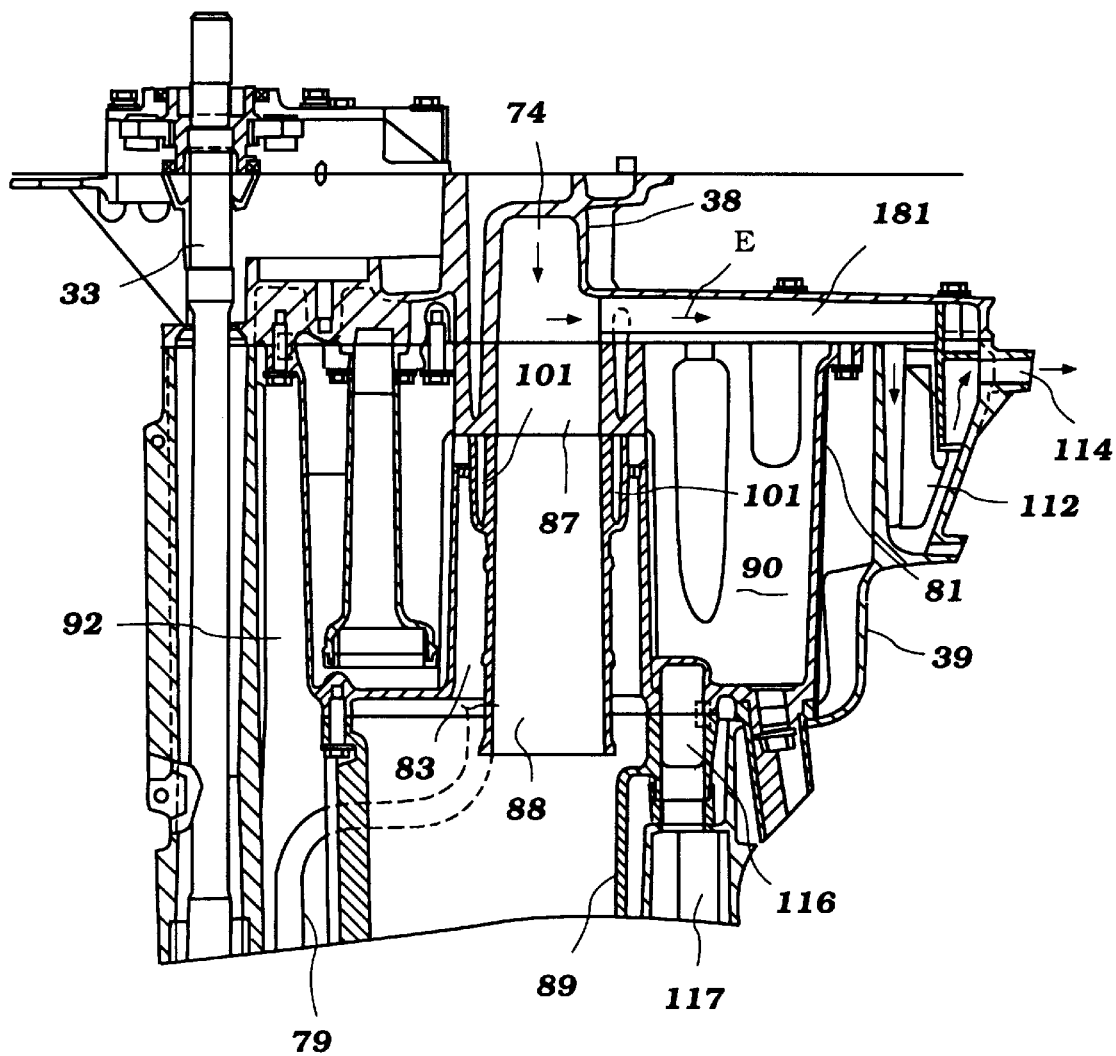
FIG. 8 is a cross-sectional view, in part similar to FIG. 3 and shows a third embodiment of the invention.
Figure 9:
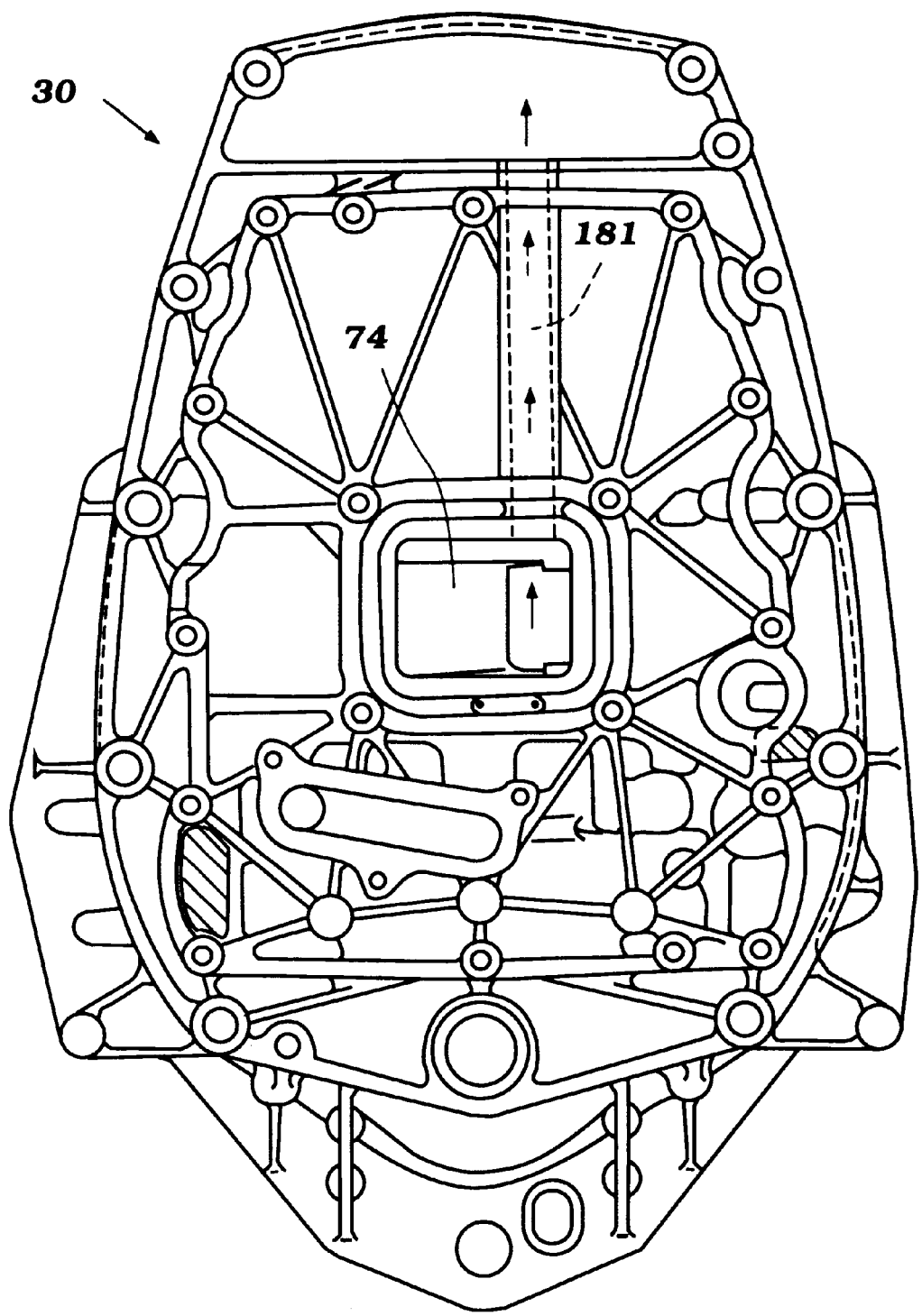
FIG. 9 is a bottom plan view of the exhaust guide for the third embodiment and is in part similar to FIG. 5.

FIGS. 8 and 9 show a third embodiment of the invention which differs from those previously described only in the way in which the idle exhaust gases are discharged from the passageway 74 of the exhaust guide plate 38 to the expansion chamber 112 formed at the rear end of the drive shaft housing element 39 for discharge through the above-the-water idle exhaust gas discharge port 114. In this embodiment, there is provided a direct passage 181 that extends rearwardly through the exhaust guide 38 from the exhaust passage 74 directly to the expansion chamber 112. Thus, with this embodiment there is a more direct flow but less expansions and contractions than with the previously described embodiments.

In all of the embodiments as thus far described, the exhaust pipe member 85 has been formed separately from the oil pan forming member 81. Next will be described two embodiments wherein these elements are formed integrally. These embodiments differ from those previously described in this feature and also in the manner of formation of the idle exhaust discharge path to the expansion chamber 112 and discharge port 114 as well as the way in which the cooling water is delivered from the engine cooling system to cool the external surface of the exhaust pipe member 85. Because these are the only differences between these embodiments and those already described, where components are the same or substantially the same they have been identified by the same reference numerals and will not be described again except insofar as is necessary to understand these additional embodiments.

Figure 10:
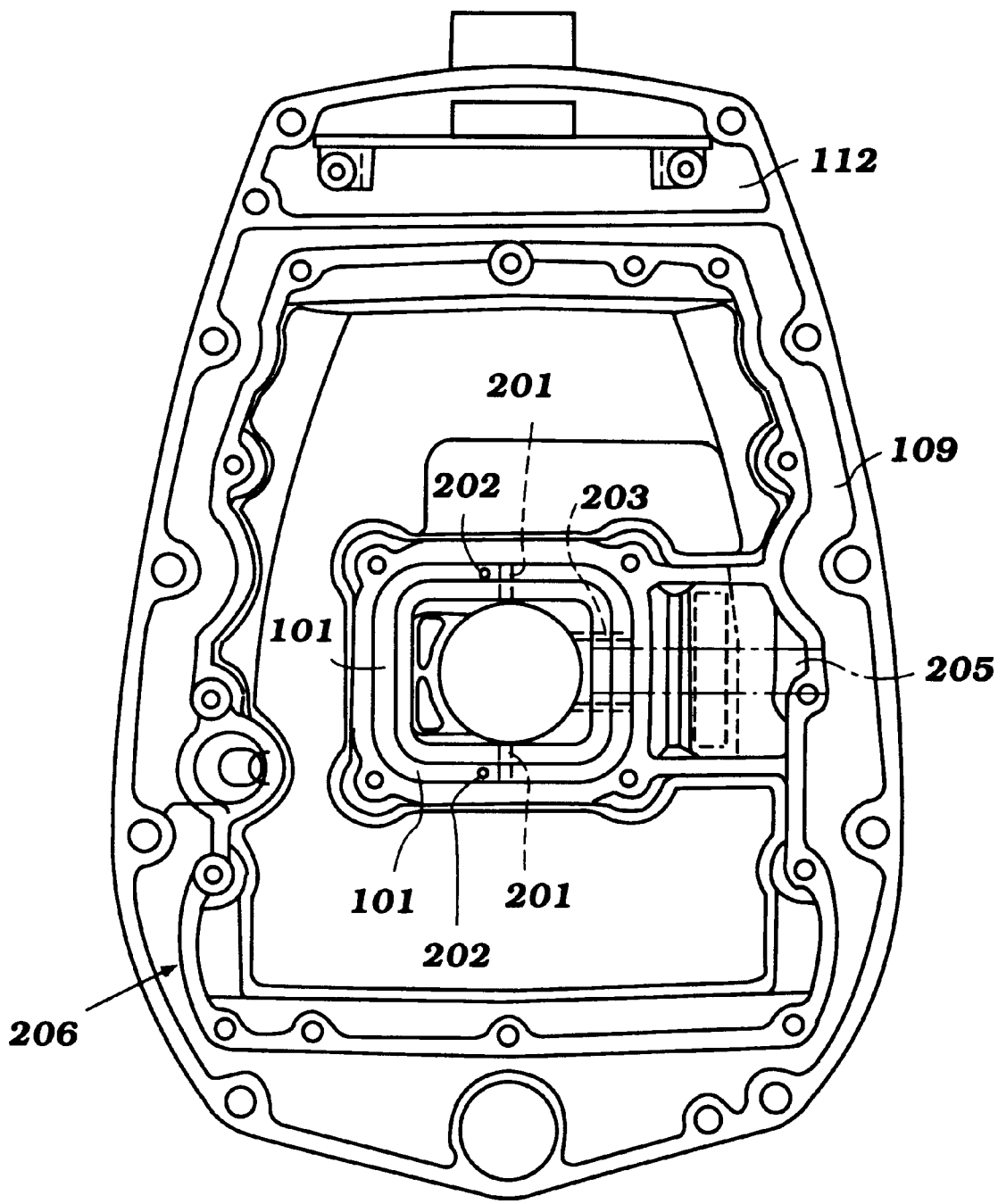
FIG. 10 is a bottom plan view, in part similar to FIGS. 5 and 9 for an exhaust guide constructed in accordance with a fourth embodiment of the invention.
Figure 11:
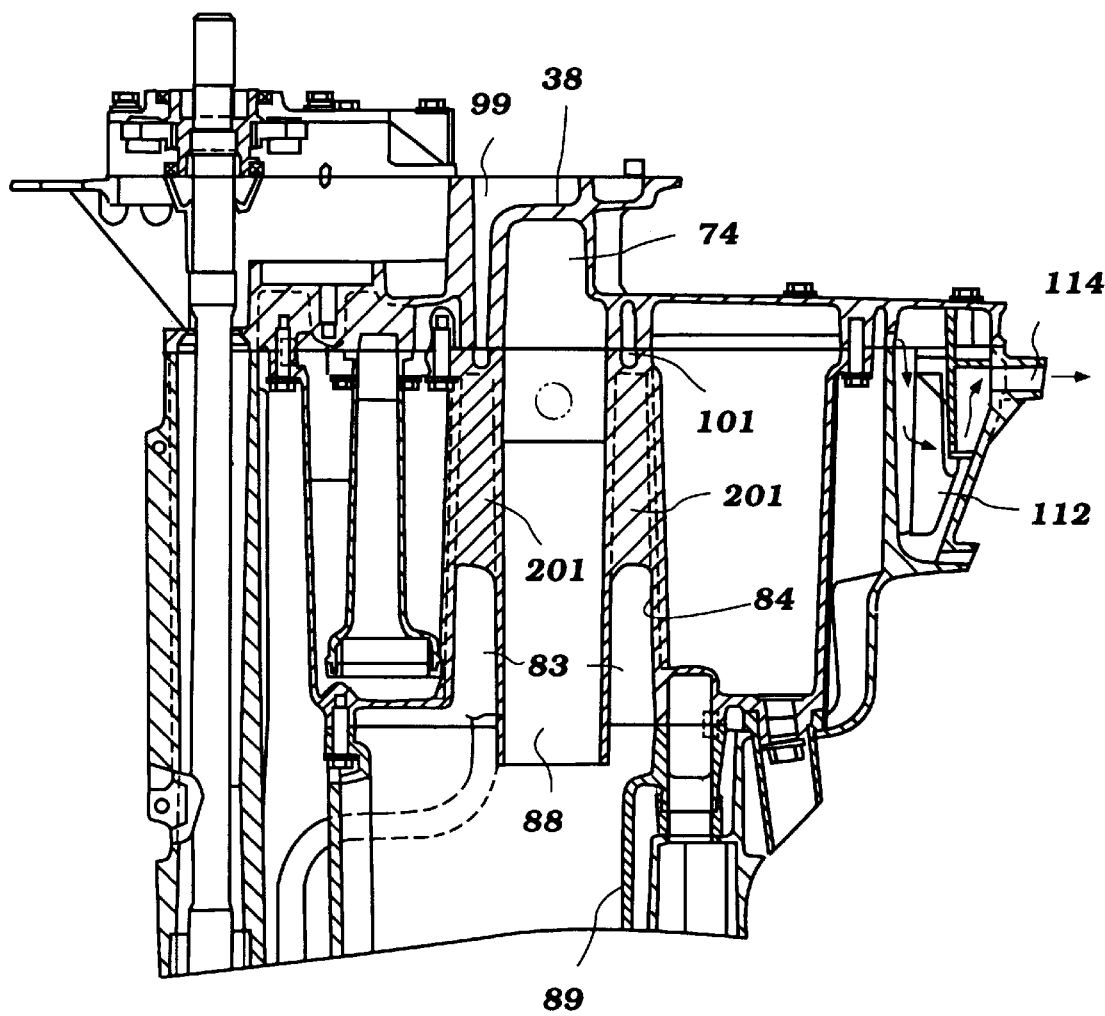
FIG. 11 is a cross-sectional view, in part similar to FIGS. 3 and 8 for the fourth embodiment of the invention.

Referring first to the embodiment of FIGS. 10 and 11, it will be noted that the exhaust pipe forming member 85 is connected integrally with the inner wall 84 of the oil pan forming member 81 by a pair of diametrically spaced vertically extending ribs 201. These ribs 201 do not extend the full length of the exhaust passage 88 nor do they extend the full height of the oil pan forming member 81. Thus, the amount of heat transferred directly through the ribs 201 is substantially minimized.

In this embodiment, the exhaust pipe cooling jacket 101 communicates directly with the cooling jacket portion 99 of the exhaust guide plate 38. This exhaust pipe cooling jacket 101 does not extend down as far as in the previously described embodiments. Therefore, it is provided with a pair of weep holes 202 (FIG. 10) that permit the water to discharged from the cooling jacket 101 to the area around the outer surface of the exhaust pipe 85. This water then flows down the lower sides of the exhaust pipe 85 to cool it and then pass into the expansion chamber 89.

It should be noted that these weep passages 202 are on one side of the ribs 201. On the opposite side of the ribs 201, the exhaust pipe is provided with an idle exhaust opening 203 which, as best seen in FIG. 10, communicates with the side expansion chamber 109 on the underside of the exhaust guide plate 38 which, in turn, communicates at it rearward end with the expansion chamber 112.

This communication is provided with through a hole to an idle exhaust gas hole 205 formed in the outer peripheral wall of the unitary member, indicated by the reference numeral 206 which is comprised of the exhaust forming member 85 and the oil pan forming member 81. Since the ribs 201 separate the weep holes 202 from the exhaust passages 203 and 205, it would be ensured that water cannot flow back to the engine through the exhaust system.

Figure 12:
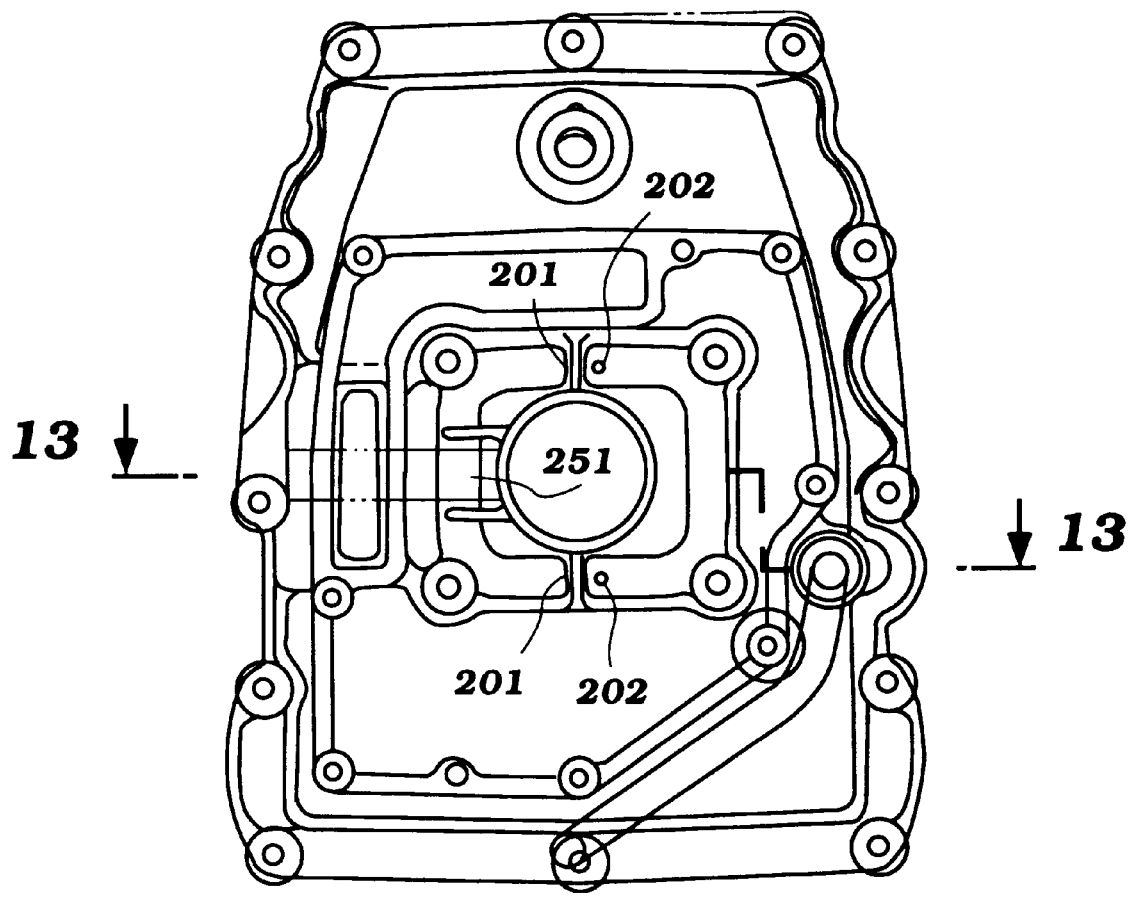
FIG. 12 is a bottom plan view, in part similar to FIGS. 5, 9 and 10 for the fifth embodiment of the invention.
Figure 13:
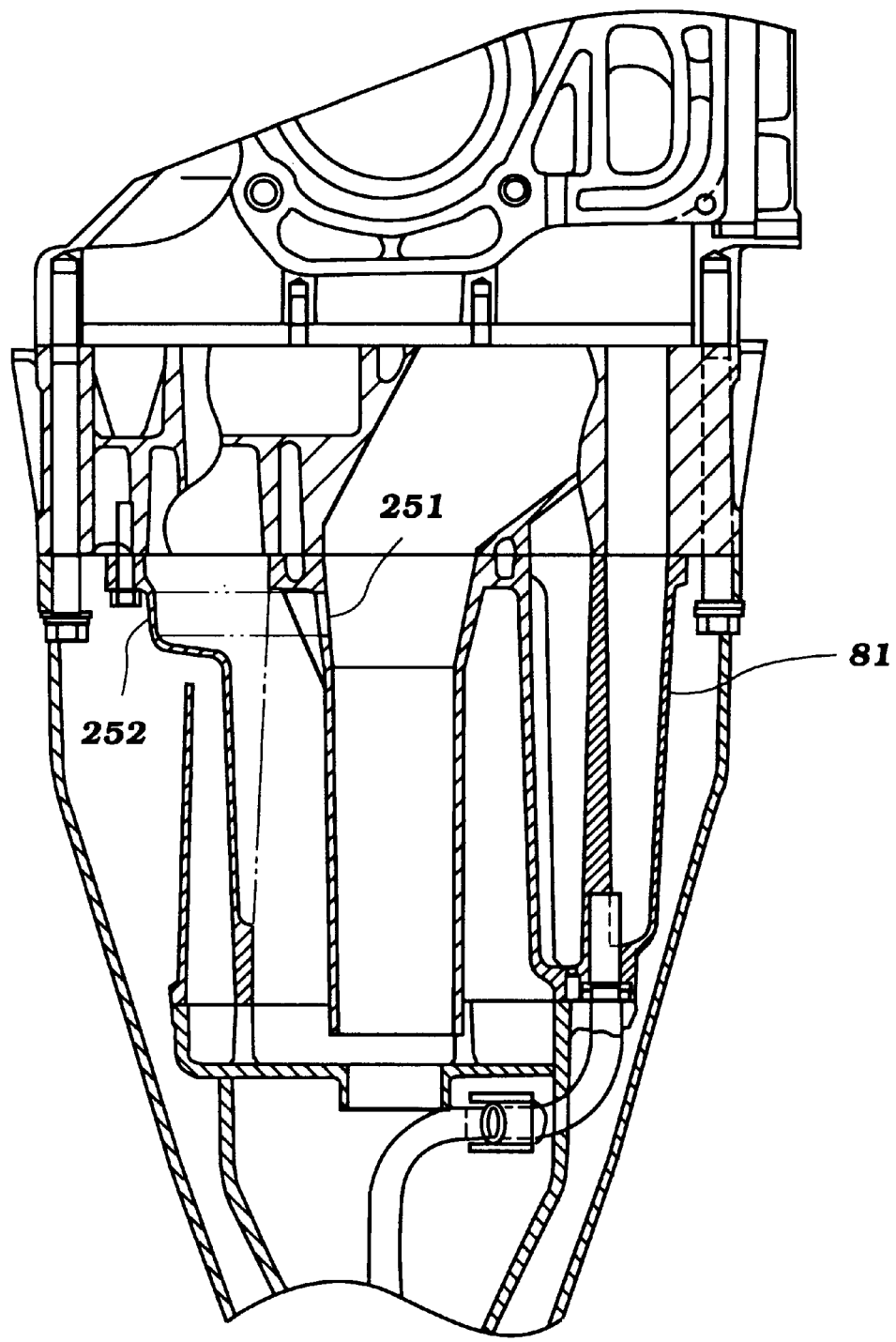
FIG. 13 is a cross-sectional view taken along the line 13—13 of FIG. 12.

FIGS. 12 and 13 show yet another embodiment of the invention which has the same general features as the embodiment of FIGS. 10 and 11. This embodiment differs from the previous embodiment only in the way in which the exhaust idle passage is formed. As seen in this figure, the weep holes 202 are formed on the opposite side of the ribs 201 from the previously described embodiments. On the opposite side of the ribs 201 from the weep holes 202, the exhaust pipe portion 85 is formed with an idle exhaust gas opening 251 which is aligned with a like opening 252 formed in the outer portion of the outer wall of the oil pan forming member 81. Thus, the exhaust gases are kept out of contact with the oil reservoir portion of this member and also the cooling water is discharged in spaced relationship so as to avoid water from entering the engine through the exhaust path.

Thus, from the foregoing descriptions it should be readily apparent that the several embodiments of the invention disclosed all are effective in providing good exhaust silencing, adequate oil reservoir volume and separation of the idle exhaust gases from the oil pan and protection against water entering the engine through the idle exhaust system. Of course, the foregoing description is that of preferred embodiments of the invention. Various changes and modifications may be made without departing from the spirit and scope of the invention, as defined by the appended claims.

We claim:

1. An outboard motor comprised of a power head and a drive shaft housing and lower unit depending from said power head, said power head containing a powering, four cycle, internal combustion engine and a surrounding protective cowling, a propulsion device contained within said lower unit for propelling an associated watercraft through a body of water in which it is operating, a transmission system for transmitting drive from said engine to said propulsion device, an expansion chamber formed in said drive shaft housing, an exhaust pipe depending from said engine into said expansion chamber for delivering of exhaust gases to said expansion chamber, an oil tank for said engine disposed in said drive shaft housing at the upper area of said expansion chamber and in proximity to said exhaust pipe, said expansion chamber communicating with the atmosphere through a below the water high speed exhaust gas discharge, an above the water low speed exhaust gas discharge formed above the normal water level, and means for communicating exhaust gasses from said engine to said above the water low speed exhaust gas discharge through a path that extends vertically above the level of oil in said oil tank.

2. An outboard motor as set forth in claim 1, wherein the engine is mounted on an exhaust guide having an exhaust passage that receives the exhaust gases from the engine and wherein the oil tank and exhaust pipe are affixed to the underside of the exhaust guide.

3. An outboard motor as set forth in claim 2, wherein the means for communicating the exhaust gases from the engine to the above-the-water low speed exhaust gas discharge is formed at least in part by the exhaust guide.

4. An outboard motor as set forth in claim 3, wherein the exhaust pipe and the oil tank are formed as a unitary assembly.

5. An outboard motor as set forth in claim 1, further including a cooling jacket formed in the exhaust pipe around its outer periphery.

6. An outboard motor as set forth in claim 5, wherein liquid coolant is delivered from the exhaust pipe cooling jacket to an area contiguous to the outer surface of the exhaust pipe so that the cooling water flows down the exhaust for discharge back to the body of water in which the watercraft is operating.

7. An outboard motor as set forth in claim 6, wherein the discharge from the exhaust pipe cooling jacket is formed above the lower end of the exhaust pipe.

8. An outboard motor as set forth in claim 7, wherein liquid coolant is supplied to the exhaust pipe cooling jacket from the cooling water supplied to the engine for its cooling.

9. An outboard motor as set forth in claim 8, wherein the bulk of the cooling water from the engine is delivered back to the body of water in which the watercraft is operating independently of the exhaust pipe cooling jacket.

10. An outboard motor as set forth in claim 9, wherein the engine cooling water that is not delivered to the exhaust pipe cooling jacket is discharged to the body of water independently of the expansion chamber.

11. An outboard motor as set forth in claim 10, wherein the engine is mounted on an exhaust guide having an exhaust passage that receives the exhaust gases from the engine and wherein the oil tank and exhaust pipe are affixed to the underside of the exhaust guide.

12. An outboard motor as set forth in claim 11, wherein the means for communicating the exhaust gases from the engine to the above-the-water low speed exhaust gas discharge is formed at least in part by the exhaust guide.

13. An outboard motor as set forth in claim 12, wherein the exhaust pipe and the oil tank are formed as a unitary assembly.

14. An outboard motor as set forth in claim 1, wherein the oil tank is formed with an open area through which the exhaust pipe passes and wherein the idle exhaust gas discharge is formed in the drive shaft housing and the means for communicating the exhaust gases from the engine to said above-the-water low speed exhaust discharge includes at least one expansion chamber separate from the expansion chamber with which the exhaust pipe communicates.

15. An outboard motor as set forth in claim 14, wherein the engine is mounted on an exhaust guide having an exhaust passage that receives the exhaust gases from the engine and wherein the oil tank and exhaust pipe are affixed to the underside of the exhaust guide.

16. An outboard motor as set forth in claim 15, wherein the means for communicating the exhaust gases from the engine to the above-the-water low speed exhaust gas discharge is formed at least in part by the exhaust guide.

17. An outboard motor as set forth in claim 16, wherein the exhaust pipe and the oil tank are formed as a unitary assembly.

18. An outboard motor as set forth in claim 14, further including a cooling jacket formed in the exhaust pipe around its outer periphery.

19. An outboard motor as set forth in claim 18, wherein liquid coolant is delivered from the exhaust pipe cooling jacket to an area contiguous to the outer surface of the exhaust pipe so that the cooling water flows down the exhaust for discharge back to the body of water in which the watercraft is operating.

20. An outboard motor as set forth in claim 19, wherein the discharge from the exhaust pipe cooling jacket is formed above the lower end of the exhaust pipe.

21. An outboard motor as set forth in claim 20, wherein liquid coolant is supplied to the exhaust pipe cooling jacket from the cooling water supplied to the engine for its cooling.

22. An outboard motor as set forth in claim 21, wherein the bulk of the cooling water from the engine is delivered back to the body of water in which the watercraft is operating independently of the exhaust pipe cooling jacket.

23. An outboard motor as set forth in claim 22, wherein the engine cooling water that is not delivered to the exhaust pipe cooling jacket is discharged to the body of water independently of either of the expansion chambers.

24. An outboard motor as set forth in claim 23, wherein the engine is mounted on an exhaust guide having an exhaust passage that receives the exhaust gases from the engine and wherein the oil tank and exhaust pipe are affixed to the underside of the exhaust guide.

25. An outboard motor as set forth in claim 24, wherein the means for communicating the exhaust gases from the engine to the above-the-water low speed exhaust gas discharge is formed at least in part by the exhaust guide.

26. An outboard motor as set forth in claim 25, wherein the exhaust pipe and the oil tank are formed as a unitary assembly.

* * * * *